United States Patent
Greiner et al.

(10) Patent No.: US 9,147,904 B2
(45) Date of Patent: Sep. 29, 2015

(54) RECHARGEABLE ENERGY STORAGE UNIT

(75) Inventors: Horst Greiner, Forchheim (DE); Alessandro Zampieri, Vittorio Veneto (IT)

(73) Assignee: SIEMENS AKTIENGESELLSCHAFT, München (DE)

(*) Notice: Subject to any disclaimer, the term of this patent is extended or adjusted under 35 U.S.C. 154(b) by 174 days.

(21) Appl. No.: 13/823,138

(22) PCT Filed: Sep. 14, 2011

(86) PCT No.: PCT/EP2011/065947
§ 371 (c)(1),
(2), (4) Date: Mar. 14, 2013

(87) PCT Pub. No.: WO2012/038312
PCT Pub. Date: Mar. 29, 2012

(65) Prior Publication Data
US 2013/0183595 A1    Jul. 18, 2013

(30) Foreign Application Priority Data
Sep. 20, 2010  (DE) .................. 10 2010 041 019

(51) Int. Cl.
| | |
|---|---|
| *H01M 4/36* | (2006.01) |
| *H01M 8/22* | (2006.01) |
| *H01M 4/86* | (2006.01) |
| *H01M 4/90* | (2006.01) |
| *H01M 8/10* | (2006.01) |
| *H01G 11/06* | (2013.01) |
| *H01M 8/24* | (2006.01) |

(52) U.S. Cl.
CPC ................. *H01M 8/22* (2013.01); *H01G 11/06* (2013.01); *H01M 4/8621* (2013.01); *H01M 4/8652* (2013.01); *H01M 4/905* (2013.01); *H01M 4/9033* (2013.01); *H01M 8/10* (2013.01); *H01M 8/1018* (2013.01); *H01M 8/24* (2013.01); *Y02E 60/128* (2013.01); *Y02E 60/521* (2013.01); *Y02E 60/525* (2013.01)

(58) Field of Classification Search
CPC .. H01G 11/06; H01M 4/8621; H01M 4/8652; H01M 4/9033; H01M 4/905; H01M 6/185; H01M 2300/0065; H01M 8/10; H01M 8/1018; H01M 8/22; H01M 8/24; Y02E 60/128; Y02E 60/521; Y02E 60/525
USPC .......... 429/465, 474, 475, 480, 496, 513, 529
See application file for complete search history.

(56) References Cited

U.S. PATENT DOCUMENTS

| | | | |
|---|---|---|---|
| 6,299,742 B1* | 10/2001 | Pal et al. ..................... | 204/243.1 |
| 2007/0224510 A1* | 9/2007 | Yamamoto et al. ........... | 429/232 |
| 2008/0118840 A1* | 5/2008 | Yew et al. ................. | 429/231.5 |
| 2008/0241688 A1* | 10/2008 | Tokita et al. ................. | 429/220 |

* cited by examiner

*Primary Examiner* — Patrick Ryan
*Assistant Examiner* — Ben Lewis

(57) ABSTRACT

A rechargeable energy storage unit is proposed. The rechargeable energy storage unit has a first and a second electrode. The first electrode is associated with metallic particles composed of a metal which can be reduced during charging operation of the energy storage unit and can be oxidized during discharging operation of the energy storage unit. The rechargeable energy storage unit has an electrolyte arranged between the electrodes. The metallic particles additionally contain a material which constrains sintering of the metallic particles.

18 Claims, 2 Drawing Sheets

RECHARGEABLE ENERGY STORAGE UNIT

CROSS REFERENCE TO RELATED APPLICATIONS

This application is the US National Stage of International Application No. PCT/EP2011/065947 filed Sep. 14, 2011 and claims the benefit thereof. The International Application claims the benefits of German application No. 10 2010 041 019.5 filed Sep. 20, 2010, both of the applications are incorporated by reference herein in their entirety.

FIELD OF THE INVENTION

The invention relates to a rechargeable energy storage unit having a first and a second electrode, the first electrode being associated with metallic particles of a metal which is reducible during charging operation of the energy storage unit and oxidizable during discharging operation of the energy storage unit, and having an electrolyte arranged between the electrodes.

BACKGROUND OF THE INVENTION

Rechargeable energy storage units are substantially based on the principle of electrochemical cells, i.e. the redox-based conversion of chemical into electrical energy or vice versa. In the process, oxidizing agents, for example oxygen ions from atmospheric oxygen, are conventionally formed on a positively charged electrode, and supplied to the negative electrode by an electrolyte which is arranged between the positive and a negative electrode and is appropriately permeable to the oxidizing agent, i.e. the oxygen ions which are formed for example.

In the case of rechargeable energy storage units, the material to be oxidized, i.e. the reducing agent, is a direct or indirect constituent of the energy storage unit, for which reason energy may be drawn from the energy storage unit until the reducing agent has been wholly oxidized. Only after a subsequent charging process of the energy storage unit with electrical energy via an external source can the energy storage unit again be discharged. Further details regarding the mode of operation of such rechargeable energy storage units are well known.

Generic energy storage units with oxygen ion-conducting electrolytes are known to have working ranges at temperatures of above 500° C., since only a correspondingly high temperature provides satisfactory conditions in particular in relation to the activity or ion conductivity of the materials used, in order to be able to allow the corresponding processes, such as for instance the electrochemical reduction of atmospheric oxygen to oxygen ions and moreover the movement thereof through the electrolytes, to proceed properly.

Owing to exposure elevated thermal loads, performance is regularly impaired in rechargeable energy storage means in particular with regard to the electrode, which is connected as an anode in discharging operation and, as a rule, is formed of a porous network of metallic particles or is associated operationally with such particles, as a result of degradation caused in particular by agglomeration of metallic particles, which results in a reduction in the active surface area of the electrode material and moreover has a negative effect on the efficiency and service life of the energy storage unit.

SUMMARY OF THE INVENTION

The problem underlying the invention is therefore that of specifying a rechargeable energy storage unit with improved long-term stability, in particular with regard to the metallic particles associated with the first electrode.

This problem is solved according to the invention by a rechargeable energy storage unit of the above-mentioned type, which is distinguished in that the metallic particles additionally contain a material which inhibits sintering of the metallic particles.

Investigations have shown that metallic particle agglomeration is surprisingly substantially attributable to sintering processes at particle boundary surfaces, which are thus regarded as the cause of particle agglomeration.

According to the invention, therefore, the metallic particles associated with the first electrode are a hybrid material, in which the sintering-inhibiting material is preferably well dispersed. This prevents the disadvantageous effects caused by sintering processes between individual metallic particles or agglomerations of a plurality of metallic particles, in particular with regard to the performance or service life of the first electrode or the entire energy storage unit. In this respect, the specific active surface area or an optionally porous structure of the first electrode is largely retained even at high operating temperatures in the range from 500-1000° C., which has an additional positive effect on a comparatively constant efficiency profile of the energy storage unit over time. The first electrode of the energy storage unit may likewise be denoted as a negative electrode, and the second electrode accordingly as a positive electrode. The electrodes may advantageously be porous.

The sintering-inhibiting material is preferably metal oxide particles. In this respect, the metallic particles associated with the first electrode may in each case be regarded as a metallic matrix with metal oxide particles preferably well dispersed therein and thus overall as oxide dispersion strengthened particles, or ODS particles for short. The metallic particles are accordingly present as a "dispersion alloy" or ODS alloy. The metallic particle agglomeration- or sintering-hindering effect of the metal oxide particles is assumed to reside in the fact that the metal oxide particles introduce additional disorder or defects into the crystal lattice of the metallic particles which prevent possible dislocation movements, so additionally putting a stop to bridge formation caused by diffusion, which results in sintering, at the respective boundary surfaces of the metallic particles. The metallic particles containing metal oxide particles, i.e. the ODS particles, are advantageously produced in such a manner that segregation phenomena do not arise for example due to different densities.

The metal oxide particles are preferably cerium oxide and/or zirconium oxide particles. It goes without saying that in exceptional cases other metal oxide particles or ceramic particles may be used.

It is additionally possible for the metal oxide particles to be doped with dopants. For the purpose of doping, scandium and/or yttrium may for example be considered for zirconium oxide and gadolinium and/or samarium for cerium oxide. It has been found that dopants further increase the above-described effect of the metal oxide particles, since the dopants would seem additionally to assist distortion of the lattice structure of the metallic particles serving as a matrix, for which reason, as explained, diffusion processes which cause sintering are at least inhibited. It is in principle possible to use similar dopants to the electrolyte material.

The metallic particles are conveniently mechanically alloyed with the sintering-inhibiting material. Mechanical alloying is a powder metallurgical production method, the difference from conventional powder metallurgy being that each individual particle may be considered to be an alloy after intensive grinding. This means that a substantially uniform alloy element distribution is achieved for each individual particle, i.e. for the purposes of the invention metal oxide particles are uniformly distributed in the metallic matrix. In the context of mechanical alloying, care is taken to prevent segregation phenomena of the metal oxide particles in the metallic matrix.

Preferably, the metallic particles each have a molar proportion of 1 to 20%, in particular of 5 to 10%, of the sintering-inhibiting material. It is accordingly possible with the stated filling ratios to achieve good properties with regard to preventing any agglomeration or sintering of the metallic particles. In exceptional cases, it is nonetheless possible for higher or lower proportions of the sintering-inhibiting material or the metal oxide particles to be present.

The metallic particles are conveniently formed of iron and/or manganese. These materials ensure the multiple repetition of redox processes, i.e. they can be repeatedly oxidized or reduced, which is of substantial significance to sustained operation or to frequent recharging of the energy storage unit. The metallic particles serve in this respect as chemical energy storage means. Similar materials may of course also be used.

In a development of the invention, the first electrode comprises a lattice-like hollow chamber structure, the metallic particles being provided in receptacles arranged in the interspaces of the hollow chamber structure. The hollow chamber structure accordingly comprises reactive regions in particular in the receptacles thereof filled with the metallic particles, at and/or in which the chemical reactions necessary for charging and discharging the energy storage unit according to the invention, i.e. redox processes, proceed. The hollow chamber structure is here advantageously likewise permeable to ions, in particular oxygen ions, and to electrons released by oxidation processes proceeding in particular at the boundary surfaces with the receptacles.

Alternatively, the first electrode may be connected with a comb-like structure forming interspaces, the interspaces facing the first electrode and being filled with the metallic particles. Here the substantially elongate chamber-like interspaces extending away from the first electrode serve as receptacles for the metallic particles or the ODS particles. The comb-like structure should be understood to be an "interconnector", which in the case of a plurality of electrically coupled energy storage units on the one hand forms an electrical connection of the energy storage units, while on the other hand functions as a physical barrier between adjacent first and second electrodes of series-connected or successive energy storage units.

In a development of the invention, a redox-active gas mixture, in particular a hydrogen-water mixture ($H_2/H_2O$), may be provided between the metallic particles. These compounds, also known as "redox shuttles", improve or stabilize redox reactions arising between the oxygen ions which have migrated through the electrolyte and the metallic particles and may stabilize or increase the efficiency of the energy storage unit as a whole. In addition or as an alternative to hydrogen-water mixtures, comparable gaseous redox pairs may be used.

In addition to the two stated configurations, the principle according to the invention of alloying metal oxide particles into metallic particles, i.e. the use of ODS particles, may be applied to any arrangement of energy storage units or fuel cells.

It is advantageous for functional operation of the rechargeable energy storage unit for the second electrode to be formed of a porous oxygen-permeable material. In this way, during discharging operation of the energy storage unit it is possible to reduce in particular continuously supplied atmospheric oxygen into oxygen ions.

Accordingly, it is convenient for the electrolyte to be a solid electrolyte with permeability to oxygen ions. In this way, the oxygen ions formed at the second electrode may diffuse through the electrolyte towards the first electrode. The electrolyte is impermeable to electrons, so as to prevent short circuits in the energy storage unit.

The invention further relates to an energy storage means, comprising a plurality of energy storage units as described above. The energy storage units are connected together in such a way that the energy storage means has a capacity corresponding to the number of series-connected energy storage units.

BRIEF DESCRIPTION OF THE DRAWINGS

Further advantages, features and details of the invention are revealed by the exemplary embodiment described below with reference to the drawings, in which.

DETAILED DESCRIPTION OF THE INVENTION

Figure 1:
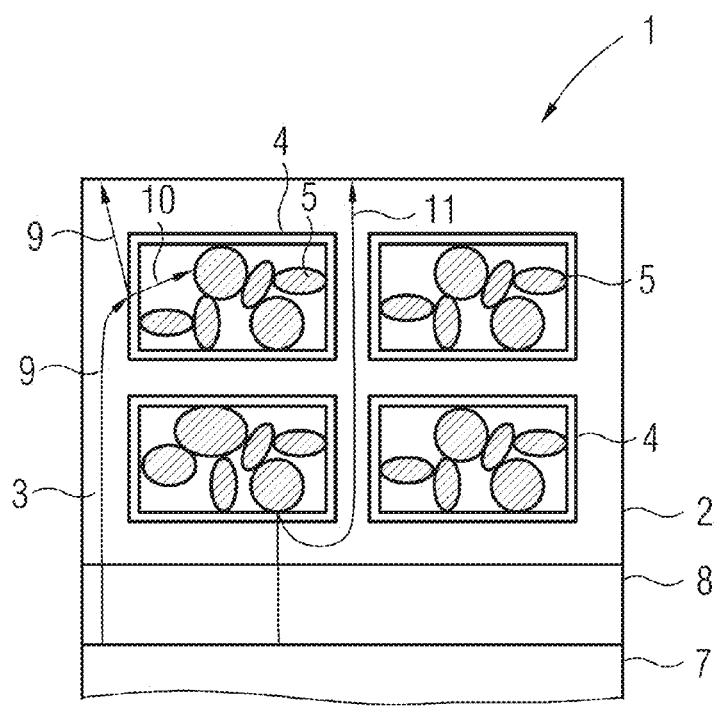
FIG. 1 is a schematic diagram of a portion of an energy storage unit according to a first embodiment according to the invention.
Figure 4:
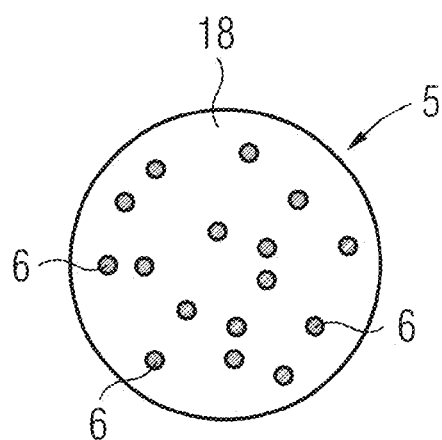
FIG. 4 is a schematic diagram of a metallic or ODS particle according to the invention associated with the first electrode.

FIG. 1 shows a schematic diagram of a portion of an energy storage unit 1 according to a first embodiment according to the invention. A porous negative or first electrode 2 is configured as a uniform, three-dimensional, lattice-like hollow chamber structure 3, wherein oxide dispersion strengthened particles, or ODS particles 5 for short, are introduced into each of the regularly distributed receptacles 4, said particles being prepared from a metallic matrix 18, for example an iron matrix, reducible during charging operation of the energy storage unit 1 and oxidizable during discharging operation of the energy storage unit 1, with metal oxide particles 6 finely dispersed therein. In this way, in comparison with the use of pure metal particles without metal oxide particles 6 dispersed therein, agglomerate formation by sintering of the metal particles due to the high operating temperatures of the energy storage unit 1 of above 500° C., in particular in the range from 600-800° C., is prevented. According to the invention, the ODS particles 5 accordingly consist of a metal matrix 18 which has sintering-inhibiting materials taking the form of metal oxide particles 6 incorporated therein by alloying, in particular by mechanical alloying. The ODS particles 5 accordingly comprise a dispersion alloy of the metal oxide particles 6 in the metal matrix 18 (cf. FIG. 4).

The metal oxide particles 6 are based for example on cerium oxide and may for instance be doped with samarium. The metal oxide particles 6 prevent or inhibit sintering in that the metal oxide particles 6 introduce additional defects into the metallic lattice structure of the metal matrix 18, so preventing dislocation movements, i.e. diffusion-based mass transfer processes, as occur for example in sinter bridge formation.

The ODS particles 5 have for example an average grain size of approx. 30-50 μm. The size of the metal oxide particles 6 is for example in the region of 0.5 μm. Any grain shape is feasible, with regard both to the ODS particles 5 and the metal oxide particles 6. Typical filling ratios for metal oxide particles 6 in the metal matrix 18 are for example between 5 and 10 mol %.

The mode of operation of the energy storage unit 1 according to the invention is substantially known and is based, with regard to its discharging operation, on the fact that at the second or positive porous electrode 7, shown only schematically in FIG. 1, atmospheric oxygen supplied continuously for example by gas flushing is reduced to oxygen ions, which oxygen ions diffuse through a solid electrolyte 8 into the first electrode 2. The electrolyte 8 is impermeable to electrons, so preventing short circuits in the energy storage unit 1, i.e. in particular between the electrodes 2, 7.

The oxygen ions diffused through the electrolyte 8 may react in two different ways with the ODS particles 5 located in the receptacles 4. According to a first alternative, indicated by the arrows 9, 10, oxygen ions are initially oxidized at the boundary surfaces of the receptacles 4 to yield elemental oxygen (cf. arrows 9), the following applying:

$$O^{2-} \rightarrow \tfrac{1}{2}O_2 + 2e^- \qquad (1).$$

The elemental oxygen further diffuses into the interior of the receptacles 4 to yield the ODS particles 5, wherein the metal matrix 18 or parts thereof oxidize(s) to yield metal oxides (cf. arrow 10). The following applies:

$$\tfrac{1}{2}O_2 + Me \rightarrow MeO \qquad (2).$$

In this case all the interior boundary surfaces of the hollow chamber structure 3 are active.

According to a second alternative, the oxygen ions diffused through the electrolyte 8 may oxidize the ODS particles 5 or the metal matrix 18 or parts thereof present at the boundary surfaces of the receptacles 4 directly into metal oxides (cf. arrow 11), the following applying:

$$O^{2-} + Me \rightarrow MeO + 2e^- \qquad (3).$$

In this case, it is primarily the boundary surfaces between the ODS particles 5 and the receptacles 4 which are active.

Advantageously, the ODS particles 5 within the receptacles 4 are in an inert, i.e. for example nitrogen, atmosphere. Alternatively, a redox-active gas mixture, in particular a hydrogen-water mixture ($H_2/H_2O$) may be provided between ODS particles 5, which mixture serves as a "redox-shuttle" and catalytically assists the redox processes as they proceed.

Figure 2:
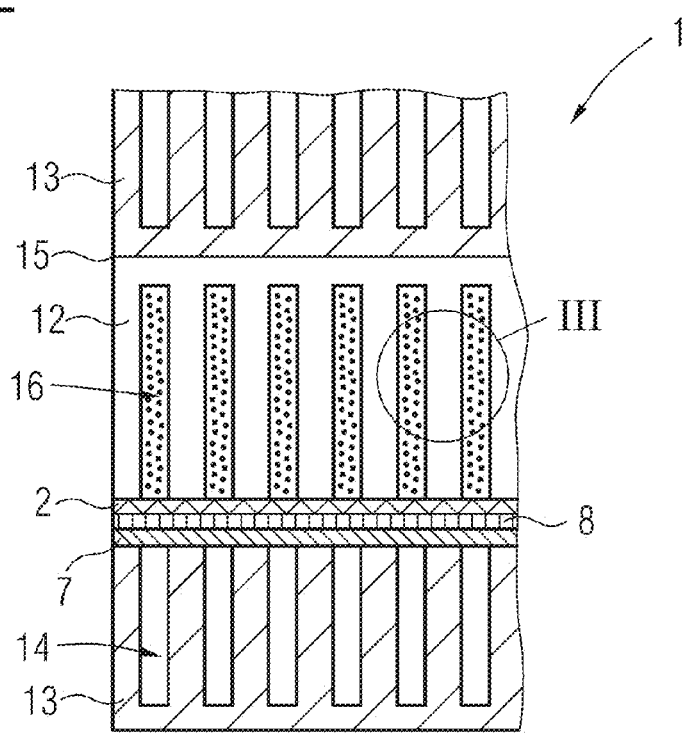
FIG. 2 is a schematic diagram of a portion of an energy storage unit according to a second embodiment according to the invention.

FIG. 2 shows a schematic diagram of a portion of an energy storage unit 1 according to a second embodiment according to the invention. The energy storage unit 1 again consists of a first electrode 2 (negative electrode) and a second electrode 7 (positive electrode), which are separated from one another by a solid electrolyte 8 permeable to oxygen ions. As is apparent, comb-like structures assuming the form of interconnectors 12, 13 are associated with both the first electrode 2 and the second electrode 7, wherein the interconnector 13 associated with the second electrode 7 acts as a gas distributor, through the comb-like interspaces 14 of which continuously flows atmospheric oxygen, which is reduced over the second electrode 7 to yield oxygen ions before passing through the electrolyte 8. The interconnectors 12, 13 are electrically connected together by interposing an electrical load (not shown).

The possibility of connecting a plurality of energy storage units 1 in series is furthermore indicated, since a bipolar layer 15 adjoins the upper end of the interconnector 12, which layer forms an electrical barrier to an interconnector 13 of a second electrode 7 of a following energy storage unit 1. A corresponding arrangement at the lower end of the energy storage unit 1, i.e. following the interconnector 13, is also conceivable. In this way, a plurality of energy storage units 1 may be stacked or connected in series to form an energy storage means.

Figure 3:
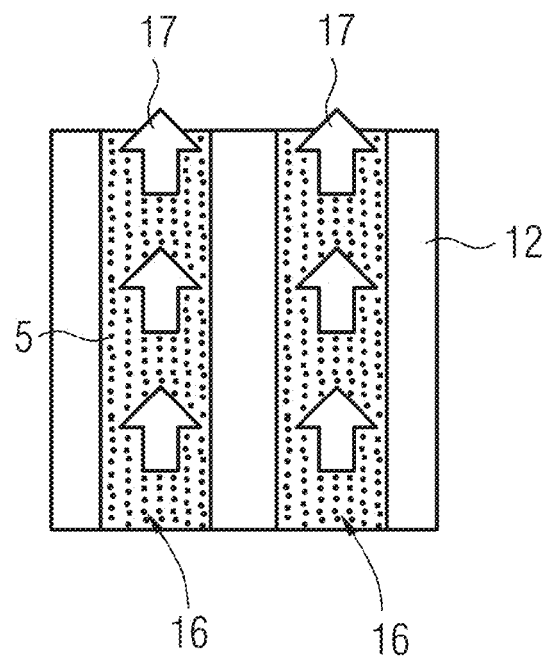
FIG. 3 is an enlarged representation of the detail of FIG. 2.

As is evident from FIG. 2 and in particular from FIG. 3, the comb-like interspaces 16 of the interconnector 12 extending from the first electrode 2 are filled with the ODS particles 5 which act as the energy storage means of the energy storage unit 1. In this way, the energy storage unit 1 has a high energy storage capacity as it contains the energy storage means itself, i.e. the ODS particles 5. It goes without saying that the invention also relates to energy storage units 1 of a differing structure, for example with a storage means for the ODS particles 5 which is arranged externally thereto and connected thereto via ion or electron conductors.

The oxygen ions which diffuse through the electrolyte 8 come into contact with the porous network-like structure of the ODS particles 5. In addition, a redox-active $H_2/H_2O$ gas mixture is located in the pores of the network-like structure, i.e. between the ODS particles 5. The oxygen ions are firstly reduced to yield elemental oxygen which flows through the interspaces of the ODS particles 5 (cf. arrow 17). In so doing, the oxygen oxidizes the ODS particles 5 or the metal matrix 18 or parts thereof to yield corresponding metal oxides, while, during discharging operation of the energy storage unit 1, the resultant free electrons supply current for a consumer.

Equally, thanks to the metal oxide particles 6 being alloyed into the metal matrix 18, i.e. thanks to the ODS particles 5 being used, this embodiment according to the invention, in comparison with unalloyed purely metallic particles, also prevents agglomeration by sintering of purely metallic particles as a result of the elevated operating temperatures of the energy storage unit 1 of above 500° C. In comparison with energy storage units 1 known from the prior art, the energy storage unit 1 is accordingly in particular improved in terms of the service life or service period thereof.

The above explanations in principle relate to discharging operation of the energy storage unit. The described processes are, however, reversible, i.e. they proceed correspondingly in the reverse direction during charging operation of the energy storage unit 1.

The invention claimed is:

1. A rechargeable energy storage unit, comprising:
a first electrode being associated with metallic particles of a metal that is reducible during charging operation of the rechargeable energy storage unit and ox disable during discharging operation of the rechargeable energy storage unit;
a second electrode; and
an electrolyte arranged between the first electrode and the second electrode,
wherein the metallic particles comprise a sintering-inhibiting material dispersed therein that inhibits sintering of the metallic particles, wherein the metallic particles are mechanically alloyed with the sintering-inhibiting material.

2. The rechargeable energy storage unit as claimed in claim 1, wherein the sintering-inhibiting material is metal oxide particles.

3. The rechargeable energy storage unit as claimed in claim 2, wherein the metal oxide particles are cerium oxide and/or zirconium oxide particles.

4. The rechargeable energy storage unit as claimed in claim 2, wherein the metal oxide particles are doped with dopants.

5. The rechargeable energy storage unit as claimed in claim 4, wherein the dopants for zirconium oxide are scandium and/or yttrium and the dopants for cerium oxide are gadolinium and/or samarium.

6. The rechargeable energy storage unit as claimed in claim 1, wherein the metallic particles each comprise a molar proportion of 1 to 20% of the sintering-inhibiting material.

7. The rechargeable energy storage unit as claimed in claim 1, wherein the metallic particles each comprise a molar proportion of 5 to 10% of the sintering-inhibiting material.

8. The rechargeable energy storage unit as claimed in claim 1, wherein the metallic particles are formed of iron and/or manganese.

9. The rechargeable energy storage unit as claimed in claim 1, wherein the first electrode comprises a lattice hollow chamber structure, and wherein the metallic particles are provided in receptacles arranged in the interspaces of the hollow chamber structure.

10. The rechargeable energy storage unit as claimed in claim 1, wherein the first electrode is connected to a comb structure forming interspaces, and wherein the interspaces face the first electrode and is filled with the metallic particles.

11. The rechargeable energy storage unit as claimed in claim 1, wherein a redox-active gas mixture is provided between the metallic particles.

12. The rechargeable energy storage unit as claimed in claim 1, wherein a hydrogen-water mixture is provided between the metallic particles.

13. The rechargeable energy storage unit as claimed in claim 1, wherein the second electrode is formed of a porous oxygen-permeable material.

14. The rechargeable energy storage unit as claimed in claim 1, wherein the electrolyte is a solid electrolyte with permeability to oxygen ions.

15. An energy storage unit, comprising:
a plurality of rechargeable energy storage units according to claim 1.

16. A rechargeable energy storage unit, comprising:
a first electrode being associated with metallic particles of a metal that is reducible during charging operation of the rechargeable energy storage unit and ox disable during discharging operation of the rechargeable energy storage unit;
a second electrode; and
an electrolyte arranged between the first electrode and the second electrode,
wherein the metallic particles comprise a sintering-inhibiting material dispersed therein that inhibits sintering of the metallic particles, and
wherein a redox-active gas mixture is provided between the metallic particles.

17. The rechargeable energy storage unit as claimed in claim 1, wherein the redox-active gas mixture comprises a hydrogen-water mixture.

18. A rechargeable energy storage unit, comprising:
a first electrode being associated with metallic particles of a metal that is reducible during charging operation of the rechargeable energy storage unit and ox disable during discharging operation of the rechargeable energy storage unit;
a second electrode; and
an electrolyte arranged between the first electrode and the second electrode,
wherein the metallic particles comprise a sintering-inhibiting material dispersed therein that inhibits sintering of the metallic particles, and
wherein the second electrode is formed of a porous oxygen-permeable material.

* * * * *